Figure 1:
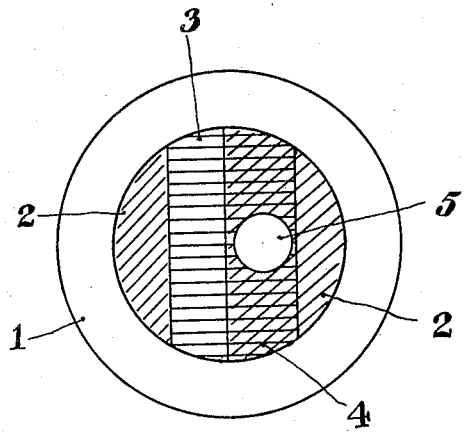

July 13, 1937.　　　　A. DRESLER　　　　2,086,791

COMPOSITE FILTER FOR PHOTOELECTRIC CELLS

Filed Nov. 16, 1933

INVENTOR.

ALBERT DRESLER.

ATTORNEY.

Patented July 13, 1937

2,086,791

UNITED STATES PATENT OFFICE 2,086,791

COMPOSITE FILTER FOR PHOTOELECTRIC CELLS

Albert Dresler, Berlin-Charlottenburg, Germany

Application November 16, 1933, Serial No. 698,359
In Germany November 19, 1932

2 Claims. (Cl. 88—1)

It is well known that one can alter the spectral sensitiveness of photo-electric cells by means of filters, but it is only in very rare cases that such alteration can be effected in the particular manner, and with the degree of accuracy required. This is due in part to the limited number of available filters, and in part to the fact that when several filters are used in series the sensitiveness is unduly reduced in respect of certain spectral ranges as compared with others. In order adequately to reduce the sensitiveness in respect of one spectral range the sensitiveness in respect of other spectral ranges must be reduced more than is necessary. This effect, commonly referred to as over-compensation, is of course undesirable. Even in those cases where the conditions are favourable the method of using filters in series is not an efficient one, because the degree of spectral sensitivity differs substantially in photo-electric cells, so that different filter combinations have to be used, and this is very inconvenient. For instance, in the case of colored glass filters both the thickness and the shade of color must generally be altered, and this is difficult and expensive.

The object of my invention is to avoid the partial over-compensation referred to. For this purpose I confine the over-compensating filter or filters to a portion of the light sensitive surface of the photo-electric cell and place in parallel therewith another filter or filters, adapted to correct the over-compensation, the correcting filter or filters being placed on the portion of the surface not covered by the over-compensating filter or filters. By this means it is possible to assimilate the spectral sensitivity of a photo-electric cell to that indicated by any biological, chemical or physical graph. The spectral response of a selenium photo-electric cell may, for example, be regulated exactly in accordance with the spectral sensitivity of the human eye by using a yellow filter and a green filter with a partial overlap, so that the purely yellow zone gives passage to red rays, and the purely green zone gives passage to blue rays, in compensation of the excessive absorption of red and blue rays in the overlap zone. For this purpose the green filter must be such that it shifts the sensitivity curve of the photo-electric cell in the direction of the shorter wave lengths, and the yellow filter must shift it in the direction of the longer wave lengths, which, if used alone, would diminish the quality of the cell. Accurate adjustment to the sensitivity curve of the human eye is accomplished by suitably proportioning the three filter zones referred to. A portion of the light sensitive surface of the cell may be left uncovered with this method of filtering so that the loss of sensitiveness due to filtering is reduced to a minimum.

The shape and distribution of the filter zones may be varied as desired. The zones may for example be bands side by side, or they may be divided up and fitted together in mosaic fashion.

The invention is illustrated in the accompanying drawing, in which

Figure 2:
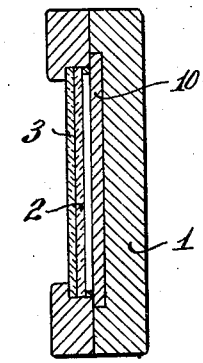

Fig. 1 is a plan view of a photo-electric cell with the compound filter thereon, Fig. 2 is a central vertical cross-section of Fig. 1.

Figure 3:
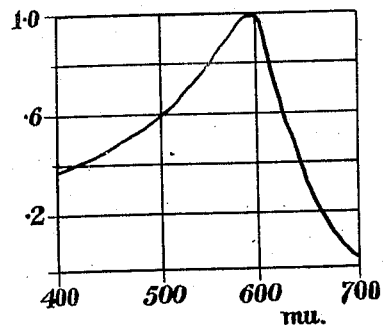
Figure 4:
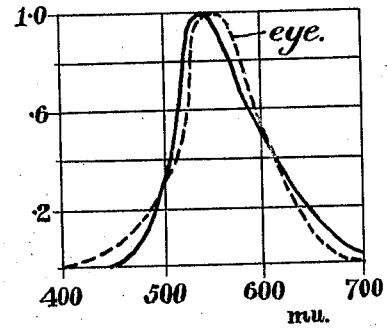

Figs. 3 and 4 being graphs illustrating the effect of filters.

In Figs. 1 and 2, 1 represents the casing of the cell 10, which in this example is circular. The compound filter is composed of two segmental pieces of glass 2, of one color, and a piece of glass 3 of another color, but the part 3 and one of the parts 2 overlap each other as indicated at 4, and there is a circular hole 5 in the filter, where the overlap occurs.

By the selection of filters with appropriate capacities of spectral transmission it is possible to give the spectral sensitiveness of the cell any desired characteristic comprised within the range which it has when unfiltered. This applies both to visible and to ultra-violet and ultra-red radiation.

Fig. 3 shows the curve of sensitiveness of a typical photo-electric cell, and Fig. 4 shows the same corrected to conform substantially with that of the human eye. With the ordinary method of using superimposed glass or gelatine filters the deviation from the desired characteristic may in some cases, e. g. with blue and red, amount to 30% or more, whereas with my improved method it may be reduced to about 0.5 or 1%.

The composite filter is also very valuable for use in comparing, with the aid of photo-electric cells, the radiating properties or effects of different sources of light, for therapeutical purposes, as for example in connection with the treatment of certain skin diseases and observation of the reaction between ergosterine and vitamine.

The invention can also be used with advantage for testing photographic material and ultra-red radiation, and with appropriate modifications it can be used in connection with the dosage of X-rays and the like.

In addition to being used with photo-electric cells of the metal disk, vacuum and gas-filled types it can be used with other radiation receivers such as thermopiles and ionization chambers.

What I claim as my invention and desire to secure by Letters Patent of the United States is:—

1. The combination, with a photoelectric cell for objective photometry, of a composite light filter whereby the spectral response of said cell is approximated to that of the human eye, said filter comprising two differently colored filter elements which overlap and are respectively of such colors that the non-overlapping parts thereof reduce the cell response in respect of the end zones of the spectrum and the overlapping parts adjust the cell response in respect of the central zone of the spectrum.

2. The combination, with a photoelectric cell for objective photometry, of a composite light filter whereby the spectral response of said cell is approximated to that of the human eye, said filter comprising two filter elements, yellow and green respectively, overlapping each other in part, the green element serving to over-compensate at the red end of the spectrum, and the yellow element serving to over-compensate at the blue end, the overlapping portions effecting corresponding neutralization in the central zone.

ALBERT DRESLER.